Nov. 29, 1932.

P. E. COOK

Re. 18,677

ELECTRICAL PROTECTIVE SYSTEM

2 Sheets-Sheet 1

Original Filed Nov. 23, 1927

Inventor: Percy E. Cook

Kerr, Hudson & Kent attys

Nov. 29, 1932.

P. E. COOK

Re. 18,677

ELECTRICAL PROTECTIVE SYSTEM 2 Sheets-Sheet 2

Original Filed Nov. 23, 1927

Inventor:
Percy E. Cook
Lewis Hudson & Kent
attys.

Reissued Nov. 29, 1932

Re. 18,677

UNITED STATES PATENT OFFICE

PERCY E. COOK, OF BELLEVUE, PENNSYLVANIA, ASSIGNOR, BY MESNE ASSIGNMENTS, TO ALLIS-CHALMERS MANUFACTURING COMPANY, OF MILWAUKEE, WISCONSIN, A CORPORATION OF DELAWARE

ELECTRICAL PROTECTIVE SYSTEM

Original No. 1,769,108, dated July 1, 1930, Serial No. 235,182, filed November 23, 1927. Application for reissue filed April 16, 1932. Serial No. 605,761.

This invention relates to improvements in switches for transformers. Primarily the invention is a safety device, the object of which is to prevent any manipulation of the electrical connections of a transformer while the transformer is energized by current flowing into any of its coils.

In electric lighting and power line systems for communities utilizing electric current in large amounts, the so-called network system, in which the low tension lines for a number of transformers are so wired as to intercommunicate, is becoming increasingly important. When such a system is employed there is danger involved in working on any of the transformers in the group when current is being fed into any one or more of the others of the group, for, even though the high tension side of a particular transformer be disconnected from the high tension line, the high tension coil may be energized by current flowing in the low tension coil. In other words, the transformer then becomes a step up rather than a step down transformer.

One of the objects of the present invention is the provision of means which shall make it impossible for a workman or any one else to move the switch while current is flowing in the low tension side of the line as the result of induction in that particular transformer or any other transformer of the group. The workman will, of course, not attempt to perform any operations upon the transformer with the switch in operative position, and if he cannot move it from that position he will know that current is passing through the transformer in either one direction or the other. He will then be forced to take the necessary steps to clear the transformer entirely.

Another object is the provision of means for short-circuiting and grounding the primary coil of the transformer, or of merely breaking the circuit between the coil and the high voltage line.

A further object is the provision of a magnetic lock for holding the switch in a given position whenever the secondary of the transformer is energized.

Still another object is the provision of a switch mechanism of the kind referred to, employing a plurality of sets of contacts, and bridging means for said sets embodying a movable element and a magnetic lock for the latter.

Other objects and features of novelty will appear as I proceed with the description of that embodiment of the invention which, for the purposes of the present application, I have illustrated in the accompanying drawings, in which Fig. 1 is a vertical central sectional view of an electric switch apparatus embodying my invention;

Figure 1:
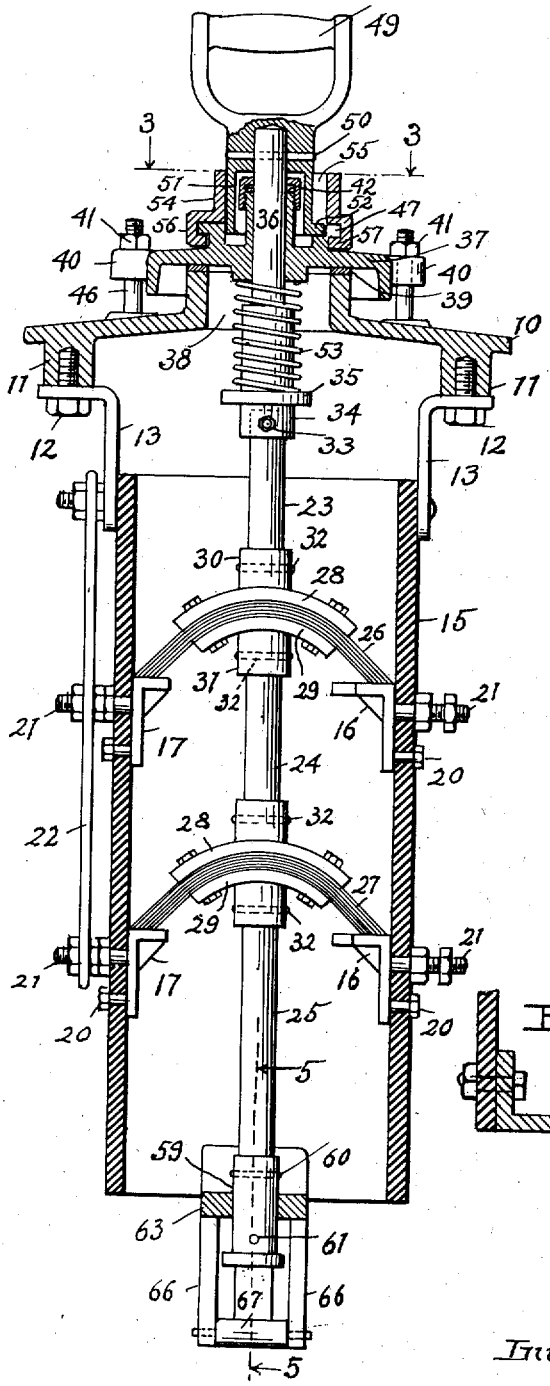
Figure 2:
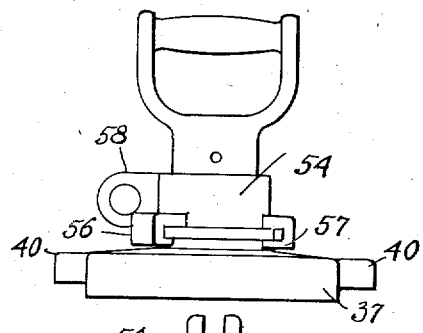
Fig. 2 is an elevational view of that portion of the apparatus which would normally be located outside the wall or top of a transformer.
Figure 3:
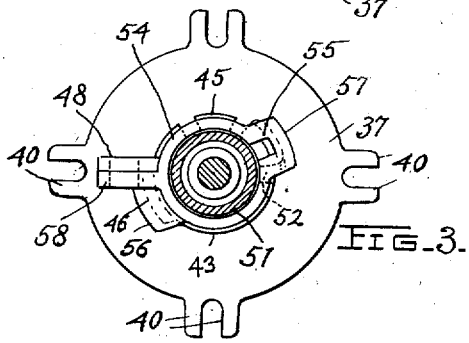
Fig. 3 is a transverse sectional view taken substantially on line 3—3 of Fig. 1.

In the drawings, a transformer top, which may be a casting, is indicated fragmentarily at 10. Integral with the top are two or more depending bosses 11 that receive fastenings 12 by means of which metal hangers 13 are supported. The hangers 13 carry an insulating tube 15, which may be built of fiber of other suitable material having good insulating qualities. Angular contacts 16, 17, 18, and 19 (see Figs. 1 and 6) have their vertical legs shaped to fit the inner contour of the insulating tube 15, and have their vertical legs secured thereto by studs 20 and 21 which pass through openings formed in the wall of the tube. The studs 21 are continued far enough beyond the wall of the tube to constitute binding posts. Outside the tube 15 the binding posts of contacts 17 are connected electrically, preferably by a copper bar or strap 22 which extends upwardly and is joined to one of the hangers 13, as shown in Fig. 1.

Arranged axially within the insulating tube 15 is a longitudinally and rotatably movable element comprising rods 23, 24 and 25 formed of suitable lengths of insulating material. Laminated copper springs 26 and 27 are interposed between the rods 23 and 24 and the rods 24 and 25, respectively, each spring being adapted to form a bridging connection between the corresponding arcuate contact 16 and one of the contacts 17, 18, 19. These springs are mounted in arcuate clamps 28 and 29, each of which is supplied with an internal hub portion 30 or 31 for the reception of one of the rods 23, 24, 25, suitable fastenings 32 being set in the hubs and rods to hold them securely together.

The upper end of insulating rod 23 has attached thereto by means of a fastening 33 a metallic extension 34 comprising a collar 35 and a reduced upper portion 36. The latter portion has a sliding and rotating fit within the hub of a plate 37 which I term a selector cover. This cover 37 closes an opening 38 in the top 10 of the transformer casing, a gasket 39 being preferably interposed in order to maintain a moisture tight joint. The periphery of the cover 37 is provided with pairs of spaced lugs 40 between which extend studs 41 that are threaded into the top plate 10 and by means of which the cover is clamped in place. At the upper end of the hub of cover 37 I mount a packing gland 42 for excluding moisture.

Figure 4:
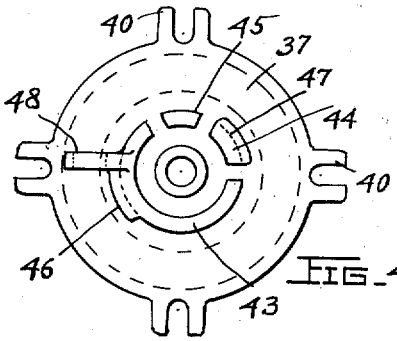
Fig. 4 is a view of the selector cover which closes the opening in the top of the casing of a transformer.
Figure 5:
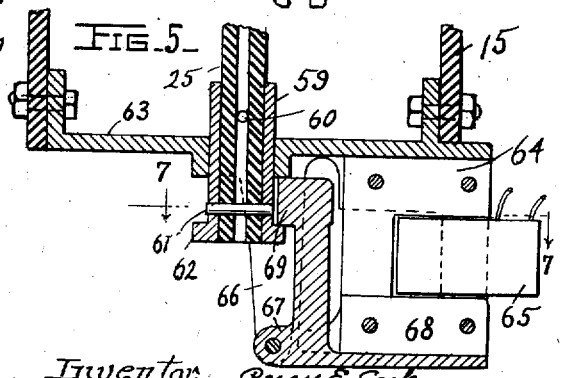
Fig. 5 is a vertical sectional detail view taken substantially on line 5—5 of Fig. 1, and illustrating the magnetic lock.

As may be seen best in Fig. 4, the cover 37 has a series of upwardly extending arc-shaped projections 43, 44 and 45 arranged in a circle, the projections 43 and 44 having outwardly extending flanges 46 and 47, respectively, and the projection 43 having also a perforated lug 48.

The upper portion 36 of the movable switch element has a handle 49 secured thereto by means of a pin 50. The lower part of the handle is in the form of a sleeve 51 which encloses the hub of the cover 37 and the packing gland 42. This sleeve at one point in its periphery and at its lower edge has an outwardly extending lug 52 which is adapted to fit within any of the three slots formed between the projections 43, 44 and 45. When the lug 52 is positioned in any one of these slots it tends to remain there, due not only to gravity but also to pressure exerted by a coil spring 53 which bears at one end against the selector cover 37 and at the other against the collar 35. In order to move the handle 49 and the movable switch element connected therewith, it is necessary first to raise the same until the lug 52 is lifted out of the slot in which it had been positioned. I provide a means for preventing such lifting of the lug 52. In the present instance this means consists of a locking ring 54, which surrounds the sleeve 51 and rides upon the tops of projections 43, 44 and 45, this ring being continuous except for an internal vertical groove 55 of a size sufficient to permit the projection 52 to move therein. The locking ring 54 may be rotated so as to bring the groove 55 into registration with any one of the slots between projections 43, 44 and 45, and thus permit the lug 52 to be raised, after which the handle may be rotated to turn the lug 52, carrying with it the locking ring 54 to a position above one of the other slots, these slots corresponding, of course, to the different positions of the springs 26 and 27. In one of its angular positions the locking ring 54 is held against vertical movement by hook-shaped projections 56 and 57 which extend around and beneath the projections 46 and 47 on the cover 37. In this same angular position the groove 55 stands above the projection 44, that is out of line with any of the slots between projections 43, 44 and 45. The locking ring is also provided with a perforated lug 58 abutting in the position named against the perforated lug 48 so that a padlock may be mounted in the perforations of the two lugs 48 and 58 to secure the locking ring against rotation. By this means the handle 49 is securely locked in any given position, preventing any unauthorized operation of the switch.

We will now consider the apparatus employed for automatically preventing the operation of the switch when current is passing in either direction through the transformer. On the lower end of rod 25 I secure, by means of pins 60 and 61, a shoe 59 having a collar 62 at its lower extremity. This shoe slides within an opening in a casting 63 which bridges the opening at the lower end of the insulating tube 15. At one end of the casting 63 there is supported an electromagnet core 64 of inverted U-shape, around one leg of which is mounted a coil 65. The casting 63 includes a pair of depending arms 66, to the lower end of which is pivoted a bell crank 67. One arm of this bell crank carries an armature 68 adapted to bridge the ends of the core 64 of the electromagnet, and the other arm carries a projection 69 which is adapted to overlap the collar 62 and prevent movement of the same.

Figure 6:
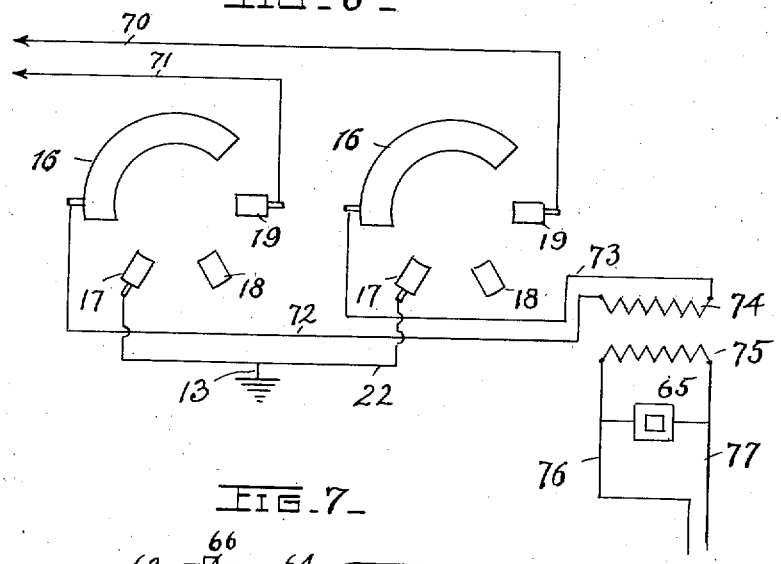
Fig. 6 is a diagram of electric circuits illustrating the use of the invention.
Figure 7:
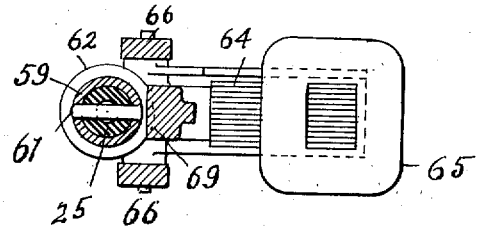
Fig. 7 is a cross sectional view of the magnetic lock, the view being taken substantially on the line 7—7 of Fig. 5.
Figure 8:
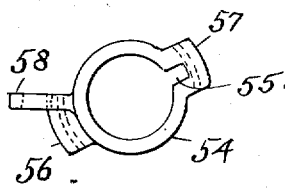
Fig. 8 is a plan view of a locking ring used in carrying out the invention.
Figure 9:
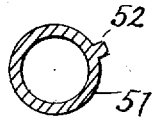
Fig. 9 is a cross sectional detail view, this view also being taken substantially on the line 3—3 of Fig. 1.

Referring now to Fig. 6, the wires of the high voltage supply line are indicated at 70 and 71 and are shown connected to the contacts 19 of the upper and lower sets of contacts. The contacts 18 have no electrical connections. The contacts 17 are shown joined together by the conductor 22 which, as previously described, may consist of a copper strap as illustrated in Fig. 1. The conductor 22 also has a ground connection through a conductor 13. The contacts 16 are joined by means of conductors 72 and 73 with the ends of the high tension or primary coil 74 of the transformer. The secondary coil 75 of the transformer has lead wires 76 and 77 extending therefrom which may have connections with other secondary coils of a network system. Shunted across the lead wires 76 and 77 is the coil 65 of the electromagnet referred to above.

Figure 10:
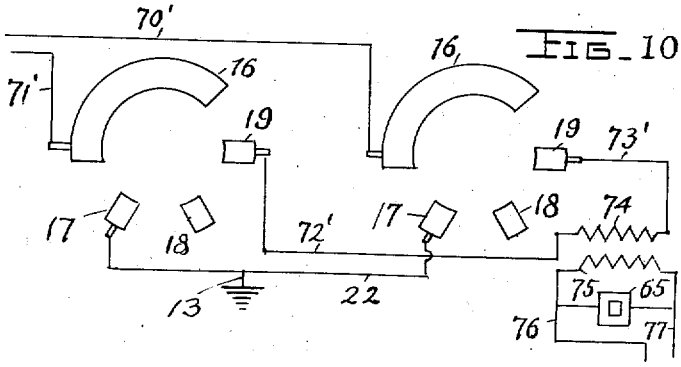
Fig. 10 is a diagram of a slightly modified arrangement of electric circuits.

In Fig. 10, the electrical connections are such that instead of short-circuiting and grounding the primary coil of the transformer, I short-circuit and ground the incoming high tension supply lines, which in this figure are numbered 70′ and 71′ and are shown connected with the large contacts 16. The primary coil in this instance is connected across the contacts 19 by conductors 72′ and 73′. In other respects this figure is identical with Fig. 6.

Whenever there is current in the low tension line wires 76 and 77 the electromagnet coil 65 is energized, lifting the armature 68 and rocking the bell crank 67 to cause the projection 69 to overlap the collar 62 and prevent upward movement of the rod 25 and the other movable portions of the switch. In normal operation the switch springs 26 and 27 bridge the two sets of contacts 16 and 19 connecting the supply lines 70, 71 or 70′, 71′ with the transformer coil 74. When the contacts 16 and 18 are bridged the supply lines are disconnected from the transformer and may be tested out for faults or may be put into service to carry other transformers. In the third position of Fig. 6, that is with the contacts 16 and 17 bridged, the supply lines are disconnected and the primary winding 74 of the transformer is simultaneously short-circuited and grounded. In the third position as illustrated in Fig. 10, on the other hand, the primary circuit of the transformer is open and the high tension feed line 70′, 71′ is short-circuited and grounded.

Before any changes whatever can be made in the switch mechanism, however, the transformer must be disconnected from the supply line by other means not herein shown, and in case there is low tension current in the conductors 76, 77 due to action of other transformers in the network, then the coil 75 must also be disconnected from the wires 76, 77. Otherwise the electromagnet coil 65 will be energized and will lock the movable switch element against upward movement. Following common practice in the art automatic breakers may be employed in the circuit 76, 77 to disconnect the coil 75 when current is not flowing in the primary coil 74, so that one operation only is needed to clear the transformer preparatory to operating the switch of this invention. As previously mentioned, tampering with the switch by an unauthorized person may be prevented by the use of a padlock positioned in the perforated lugs 48 and 58, thus holding the locking ring 54 from rotation and retaining the lug 52 in position in one of the slots between projections 43, 44 and 45.

Obviously, the switch hereinbefore described may be used with transformers other than those employed in an underground network system; the switch need not necessarily be mounted integral with the transformer but may be separately housed; the switch in its different positions may make connections other than those described above; more or less than three operating positions may be incorporated in the switch; and the switch may be employed in connection with either single phase or three phase circuits.

The novel features of the hereinbefore described switch mechanism are claimed in an application, Serial No. 423,629, filed January 27, 1930, and which is a division hereof.

It is claimed and desired to secure by Letters Patent:

1. In combination, a transformer, a switch in the high tension side of the line comprising a contact which swings in moving from one position to another, a longitudinally movable support for said contact, means necessitating the longitudinal movement of the support prior to the swinging of said contact, and electro-magnetic means located in the low tension side of the line for preventing the actuation of the switch.

2. In combination, a transformer, a switch for the high tension side of the line comprising a longitudinally displaceable rod, a contact arm extending outwardly from said rod, means necessitating the longitudinal movement of the rod prior to the swinging of said arm, and electromagnetic means located in the low tension side of the line for preventing the longitudinal movement of the rod when said electromagnetic means is energized.

3. In combination, a transformer, a casing therefor, a switch for the high tension side of the line comprising a rod extending through said casing, a contact arm extending outwardly from said rod within said casing, a plurality of fixed contacts within the casing adapted to be engaged by said arm simultaneously, means necessitating the longitudinal movement of the rod prior to the swinging of said arm to engage or disengage said contacts, a handle for the rod outside said casing, and electromagnetic means within the casing located in the low tension side of the line for preventing the longitudinal movement of the rod.

4. In combination, a transformer, a casing therefor, a switch for the high tension side of the line comprising a rod extending through said casing, a contact arm mounted upon said rod within the casing, a plurality of fixed contacts within the casing adapted to be engaged by said arm simultaneously, a spring tending to move said rod longitudinally and hold it in adjusted position, and electromagnetic means in the casing located in the low tension side of the line for holding the rod in adjusted position.

5. In combination, a transformer, a switch therefor comprising a pair of fixed contacts connected across the primary coil of the transformer, a second pair of fixed contacts connected with the high tension line, and a third pair of fixed contacts connected together, two movable switch arms adapted to bridge each of the contacts of one pair with the individual contacts of one of the other pairs, and means for preventing the movement of said switch arms so long as there is current in the low tension coil of the transformer.

6. In an electrical system, an electrical supply line, a transformer, switch means operable to provide for connection and disconnection of said transformer with respect to said line, said switch means including a switch member supported for movement in different directions, means operable to prevent movement of said member in one of said directions independently of movement of the same first in another of said directions, means operable to lock said member against movement in said last mentioned direction, and means responsive to operating conditions of said transformer and operable upon occurrence of such conditions to hold said locking means in locking position.

7. An electrical protective system comprising a transmission line subject to the flow of current therein, a coil having a winding disposed for connection with said line to be energized by current from said line, a second coil having a winding inductively associated with the first said coil and subject to the flow of current therein, a ground connection, switch mechanism having a movable member disposed to be actuated to selectively effect connection of said line with said first mentioned winding or with said ground connection, and electromagnetic means disposed to prevent actuation of the said movable member during times of flow of current in either of said windings.

8. An electrical protective system comprising a transmission line, a ground connection, a transformer having high and low tension windings, a switch having a movable member operable to one position to connect said line to said high tension windings and operable from said one position to another position to disconnect said high tension winding from said line and to connect said high tension winding to said ground connection, and means comprising an electromagnetically actuated lock for preventing movement of said member when said transformer is energized.

9. An electrical protective system comprising a transmission line, a ground connection, a transformer having primary and secondary windings, a switch having a movable member operable to one position to connect said transmission line to said primary winding and operable from said one position to a second position to disconnect said primary winding from said line and operable to a third position to connect said line to said ground connection, and electromagnetically actuated locking means for locking said movable member in one of said positions when said transformer is energized.

10. In combination, a transmission line, a transformer having high and low tension windings, a switch comprising a first set of spaced contacts connected to said high tension winding, a second set of spaced contacts connected to said transmission line, a third set of spaced contacts connected together and to ground, means for causing said second set of contacts to be electrically connected selectively either to said first set of contacts or to said third set of contacts, and electromagnetically actuated locking means responsive to the energization of said transformer for preventing said second set of contacts from being electrically disconnected from said first set of contacts when said transformer is energized.

11. In combination, a transformer having a casing and having high and low tension windings within said casing, a ground connection, a transmission line normally connected to said high tension winding, switch mechanism mounted on said casing and operable to disconnect said transmision line from said high tension winding and operable to connect said transmission line to said ground connection, and means responsive to the energization of said transformer for preventing operation of said switch mechanism when said transformer is energized.

12. In combination, a transformer having a casing and having primary and secondary windings within said casings, a ground connection, a transmission line normally connected to said primary winding, a switch supported by said casing and having a movable member operable to one position to connect said transmission line to said primary winding and operable from said one position to a second position to disconnect said primary winding from said line and operable to a third position to connect said line to said ground connection, an electromagnetically actuated locking means for locking said movable member in one of said positions when said transformer is energized.

13. In an electrical protective system having a transformer and a circuit breaker for connecting and disconnecting the low tension winding of said transformer to and from a load circuit, the combination of a transmission line for supplying energy to said transformer, a ground connection, a switch having a movable member operable to one position to connect said line to the high tension winding of said transformer and operable from said position to a second position to disconnect said line from said high tension winding and operable to a third position to connect said line to said ground connection, and means comprising an electromagnetically actuated locking device for preventing movement of said member unless said circuit breaker is open and said line is deenergized.

14. In an electrical protective system comprising a transmission line and a ground connection, the combination of a transformer provided with a casing and provided with high and low tension windings within said casing, manually operable switch mechanism carried by said casing and comprising a movable member manually operable to one position to connect said transmission line to said high tension winding and manually operable to a second position to disconnect said primary winding from said transmission line, and manually operable to a third position to connect said transmission line to said ground connection, and a locking mechanism having a coil connected with said low tension winding and having a lock member so arranged that operation of said movable member is prevented when said coil is energized.

PERCY E. COOK.